(12) United States Patent
Shibayama

(10) Patent No.: US 9,952,648 B2
(45) Date of Patent: Apr. 24, 2018

(54) DIGITAL FILTERING DEVICE, DIGITAL FILTERING METHOD, AND STORAGE MEDIA STORING PROGRAM

(71) Applicant: NEC Corporation, Minato-ku, Tokyo (JP)

(72) Inventor: Atsufumi Shibayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 15/021,742

(22) PCT Filed: Sep. 11, 2014

(86) PCT No.: PCT/JP2014/004682
§ 371 (c)(1),
(2) Date: Mar. 14, 2016

(87) PCT Pub. No.: WO2015/045310
PCT Pub. Date: Apr. 2, 2015

(65) Prior Publication Data
US 2016/0224093 A1     Aug. 4, 2016

(30) Foreign Application Priority Data

Sep. 24, 2013  (JP) .................................. 2013-196638

(51) Int. Cl.
*G06F 17/14* (2006.01)
*G06F 1/32* (2006.01)

(52) U.S. Cl.
CPC .............. *G06F 1/3234* (2013.01); *G06F 1/32* (2013.01); *G06F 17/142* (2013.01)

(58) Field of Classification Search
CPC .................................................... G06F 17/142
See application file for complete search history.

(56) References Cited

U.S. PATENT DOCUMENTS

2009/0225908 A1* 9/2009 Masuda .............. H04L 27/2647
375/343
2013/0279632 A1* 10/2013 Kim ........................ H04L 27/20
375/302

FOREIGN PATENT DOCUMENTS

| JP | H08-137832 A | 5/1996 |
| JP | 2001-056806 A | 2/2001 |
| JP | 2005-101695 A | 4/2005 |
| JP | 2010-028470 A | 2/2010 |
| JP | 2010-050578 A | 3/2010 |
| WO | 2013/057855 A1 | 4/2013 |
| WO | 2013/057856 A1 | 4/2013 |

OTHER PUBLICATIONS

International Search Report for PCT Application No. PCT/JP2014/004682, dated Dec. 16, 2014.
(Continued)

Primary Examiner — Albert Wang

(57) ABSTRACT

A digital filtering device is provided that makes it possible to reduce the size and power consumption of circuitry for filtering using FFT and IFFT. The digital filtering device includes a first filtering unit for receiving first data in a first sequence, performing a first filtering process including a fast Fourier transformation process and an inverse fast Fourier transformation process on the first data, and outputting second data in the first sequence.

7 Claims, 7 Drawing Sheets

(56) References Cited

OTHER PUBLICATIONS

English translation of Written opinion for PCT Application No. PCT/JP2014/004682.
J. W. Cooley, J. W. Tukey, "An Algorithm for the Machine Calculation of Complex Fourier Series," Mathematics of Computation, US, American Mathematical Society, Apr. 1965, vol. 19, No. 90, pp. 297-301.
D. P. Kolba, "A Prime Factor FFT Algorithm Using High-Speed Convolution," IEEE Trans. on Acoustics, US, IEEE Signal Processing Society, Aug. 1977, vol. 29, No. 4, pp. 281-294.

* cited by examiner

FIG. 3

| | ps(0) | ps(1) | ps(2) | ps(3) | ps(4) | ps(5) | ps(6) | ps(7) |
|---|---|---|---|---|---|---|---|---|
| P1 | 0 | 1 | 2 | 3 | 4 | 5 | 6 | 7 |
| P2 | 8 | 9 | 10 | 11 | 12 | 13 | 14 | 15 |
| P3 | 16 | 17 | 18 | 19 | 20 | 21 | 22 | 23 |
| P4 | 24 | 25 | 26 | 27 | 28 | 29 | 30 | 31 |
| P5 | 32 | 33 | 34 | 35 | 36 | 37 | 38 | 39 |
| P6 | 40 | 41 | 42 | 43 | 44 | 45 | 46 | 47 |
| P7 | 48 | 49 | 50 | 51 | 52 | 53 | 54 | 55 |
| P8 | 56 | 57 | 58 | 59 | 60 | 61 | 62 | 63 |

← CYCLES 1 2 3 4 5 6 7 8

FIG. 4

← CYCLES

| | qs(0) | qs(1) | qs(2) | qs(3) | qs(4) | qs(5) | qs(6) | qs(7) |
|---|---|---|---|---|---|---|---|---|
| Q1 | 0 | 8 | 16 | 24 | 32 | 40 | 48 | 56 |
| Q2 | 1 | 9 | 17 | 25 | 33 | 41 | 49 | 57 |
| Q3 | 2 | 10 | 18 | 26 | 34 | 42 | 50 | 58 |
| Q4 | 3 | 11 | 19 | 27 | 35 | 43 | 51 | 59 |
| Q5 | 4 | 12 | 20 | 28 | 36 | 44 | 52 | 60 |
| Q6 | 5 | 13 | 21 | 29 | 37 | 45 | 53 | 61 |
| Q7 | 6 | 14 | 22 | 30 | 38 | 46 | 54 | 62 |
| Q8 | 7 | 15 | 23 | 31 | 39 | 47 | 55 | 63 |

DIGITAL FILTERING DEVICE, DIGITAL FILTERING METHOD, AND STORAGE MEDIA STORING PROGRAM

This application is a National Stage Entry of PCT/JP2014/004682 filed on Sep. 11, 2014, which claims priority from Japanese Patent Application 2013-196638 filed on Sep. 24, 2013, the contents of all of which are incorporated herein by reference, in their entirety.

TECHNICAL FIELD

The present invention relates to computation processing in digital signal processing and, in particular, to a digital filtering device, a digital filtering method, and a storage media storing a program.

BACKGROUND ART

One of important processes in digital signal processing is a Fast Fourier Transformation (hereinafter, abbreviated to "FFT") process. For example, a frequency domain equalization (FDE) technique is known as a technique for compensating for waveform distortion in signal transmission in wireless communication or wired communication. In the FDE, signal data in the time domain are transformed into data in the frequency domain by FFT, and then the transformed data are filtered for equalization. The data after the filtering are retransformed into signal data in the time domain by inverse FFT (hereinafter, abbreviated to "IFFT") to compensate for waveform distortion of the original time-domain signal. Hereinafter, FFT and IFFT will be referred to as "FFT/IFFT" unless FFT and IFFT need to be distinguished from one another.

The FFT/IFFT processing generally includes "butterfly computation". For example, PLT 1 discloses an FFT device using the butterfly computation. PLT 1 also discloses aftermentioned "twiddle multiplications", that is, multiplications using twiddle factors.

The butterfly computation introduced by Cooley-Tukey, which NPL 1 discloses, is well known as an efficient FFT/IFFT processing method, for example. However, Cooley-Tukey FFT/IFFT requires complicated circuitry due to a large number of points. A Prime Factor algorithm described in NPL 2, for example, is therefore used to decompose FFT/IFFT into two smaller FFT/IFFT operations, and the FFT/IFFT processing is performed.

FIG. 6 illustrates a dataflow 500 of 64-point FFT decomposed into two-stage butterfly processing with radix-8 by using the Prime Factor algorithm, for example. The dataflow 500 includes a data rearranging process 501, 16 k times in total of radix-8 butterfly computation processes composed of butterfly computation processes 502, 503, and a twiddle multiplication process 504.

In the dataflow illustrated in FIG. 6, inputted time-domain data x(n) (n=0, 1, . . . , 63) are Fourier-transformed into frequency-domain signals X(k) (k=0, 1, . . . , 63) by FFT processing. Part of the dataflow is omitted in FIG. 6. The basic configuration of the dataflow in FIG. 6 is the same as one for IFFT processing.

If the number of points of FFT is large, circuit implementation of the entire dataflow in FIG. 6 requires huge-size circuitry. Therefore, if the number of points of FFT is large, it is common practice to use repeatedly a circuit processing part of the dataflow, depending on required processing performance, to achieve the entire FFT processing.

For example, if an FFT device, which performs FFT processing on eight pieces of data in parallel (hereinafter, referred to as "in 8-data parallel" for short) in the dataflow in FIG. 6, is formed as a physical circuit, 64-point FFT processing can be achieved by eight repeated processes in total.

The eight repeated processes, in which a process is performed in sequence for each of partial dataflows 505a to 505h performed on eight pieces of data, are performed specifically as follows. That is to say, a process corresponding to the partial dataflow 505a is performed in the first round, a process corresponding to the partial dataflow 505b is performed in the second round, and a process corresponding to the partial dataflow 505c (not shown) is performed in the third round. The subsequent processes are performed similarly in sequence up to a process corresponding to the eighth round of partial dataflow 505h. The above-mentioned processes can achieve 64-point FFT processing.

The butterfly computation includes reading data arranged sequentially in a sequence according to a predetermined rule and processing the data. This requires rearranging data in the butterfly computation. PTL 2 and PTL 3 disclose the rearrangement of data for the butterfly computation, for example. Storage means such as random access memories (RAMs) and registers is used in order to rearrange data. PTL 3 discloses the rearrangement of data using RAMs.

In signal processing such as FDE, the FFT processing is performed in blocks each of which is composed of a plurality of pieces of data. Accordingly, filtering is also performed in blocks, and therefore it is difficult to achieve adaptive filtering in which filter coefficients vary at short time intervals, for example. Therefore, it may be desirable, depending on filtering processes to be implemented, to adopt a time domain equalization (TDE) technique in which filtering for equalization is performed in time domain on signal data in time domain without transformation.

Therefore, a method can be adopted of choosing more appropriate implementation method according to filtering processing to be implemented for each of frequency-domain filtering and time-domain filtering. For example, in an optical transmission system, it can be performed to achieve compensation for linear waveform distortion by frequency-domain filtering and to achieve compensation for nonlinear waveform distortion by time-domain filtering. In addition, in some cases, the frequency-domain filtering and the time-domain filtering can be repeated a plurality of times (see PTL 4 and PTL 5, for example).

Alternatively, there is an adaptive equalization processing technique that uses frequency-domain filtering in combination with time-domain filtering (PTL 6).

CITATION LIST

Patent Literature

[PTL 1] Japanese Patent Application Laid-Open Publication No. 8-137832 (pp. 3 to 5, FIG. 25)
[PTL 2] Japanese Patent Application Laid-Open Publication No. 2005-101695 (P. 5, FIGS. 2 and 3)
[PTL 3] Japanese Patent Application Laid-Open Publication No. 2001-56806 (P. 5, FIG. 1)
[PTL 4] Japanese Patent Application Laid-Open Publication No. 2010-28470
[PTL 5] Japanese Patent Application Laid-Open Publication No. 2010-50578

[PTL 6] International Publication Number WO 2013/057856 (p. 15, p. 27, FIGS. 6 and 15)

Non Patent Literature

[NPL 1] J. W. Cooley, J. W. Tukey, "An Algorithm for the Machine Calculation of Complex Fourier Series," Mathematics of Computation, US, American Mathematical Society, April 1965, Vol. 19, No. 90, pp. 297-301
[NPL 2] D. P. Kolba, "A Prime Factor FFT Algorithm Using High-Speed Convolution," IEEE Trans. on Acoustics, US, IEEE Signal Processing Society, August 1977, Vol. 29, No. 4, pp. 281-294

SUMMARY OF INVENTION

Technical Problem

As mentioned above, data needs rearranging in order to perform the butterfly computation. Rearranging data requires storage means such as a RAM as shown in PTL 3. Performing FFT/IFFT with a large number point requires large-capacity storage means. Consequently, in order to reduce the cost or power consumption of a filtering device, it is desirable to minimize the frequency of rearranging data.

Further, frequency-domain filtering and time-domain filtering can be repeated multiple times as the techniques shown in PTL 4 to PTL 6. If filtering using FFT/IFFT processing is performed multiple times, a plurality of FFT circuits or IFFT circuits are required. In this case, the size of a data rearranging circuit increases in proportion to the number of FFT circuits or IFFT circuits. Therefore, if the processing using a plurality of FFT circuits or IFFT circuits is performed, it is necessary to minimize the frequency of rearranging data.

Object of Invention

The object of the present invention is to provide a digital filtering device, a digital filtering method, and a storage medium storing a program to reduce the size and power consumption of circuitry for filtering using FFT and IFFT.

Solution to Problem

A digital filtering device according to an exemplary aspect of the present invention includes first filtering means for receiving first data in a first sequence, performing a first filtering process including a fast Fourier transformation process and an inverse fast Fourier transformation process on the first data, and outputting second data in the first sequence.

A digital filtering method according to an exemplary aspect of the present invention includes receiving first data in a first sequence; performing a first filtering process on the first data, the first filtering process including a fast Fourier transformation process and an inverse fast Fourier transformation process; and outputting second data in the first sequence.

A storage medium according to an exemplary aspect of the present invention stores a program for making a computer included in a digital filtering device function as filtering means for receiving first data in a first sequence, performing on the first data a first filtering process including a fast Fourier transformation process and an inverse fast Fourier transformation process, and outputting second data in the first sequence.

Advantageous Effects of Invention

The present invention makes it possible to reduce the size and power consumption of circuitry for filtering using FFT and IFFT.

BRIEF DESCRIPTION OF DRAWINGS

FIG. 3 is a diagram illustrating an arrangement of data sets in serial in-order in accordance with the first exemplary embodiment of the present invention.
FIG. 4 is a diagram illustrating an arrangement of data sets in bit-reverse-order in accordance with the first exemplary embodiment of the present invention.

DESCRIPTION OF EMBODIMENTS

First Exemplary Embodiment

Figure 1:
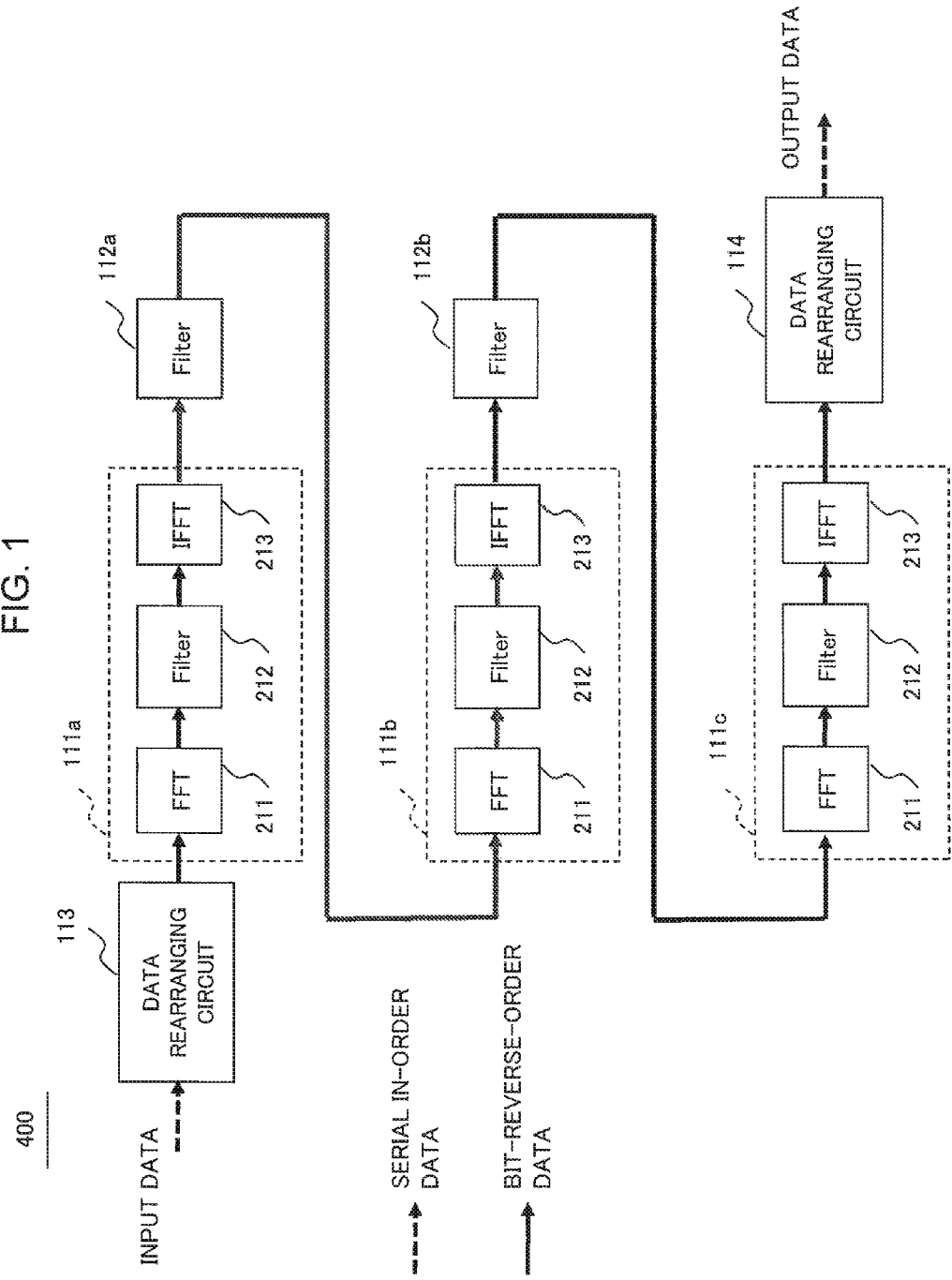
FIG. 1 is a block diagram illustrating a configuration of a digital filtering device 400 in accordance with a first exemplary embodiment of the present invention.

FIG. 1 is a block diagram illustrating an exemplary configuration of a digital filtering device 400 in accordance with a first exemplary embodiment of the present invention.

The digital filtering device 400 includes a first digital filter circuit 111a, a second digital filter circuit 111b, a third digital filter circuit 111c, a fourth digital filter circuit 112a, a fifth digital filter circuit 112b, a first data rearranging circuit 113, and a second data rearranging circuit 114.

The first digital filter circuit 111a, the second digital filter circuit 111b, and the third digital filter circuit 111c perform frequency-domain filtering using FDE, for example. Each of the first digital filter circuit 111a, the second digital filter circuit 111b, and the third digital filter circuit 111c includes an FFT circuit 211, a filter computation circuit 212, and an IFFT circuit 213.

On the other hand, the fourth digital filter circuit 112a and the fifth digital filter circuit 112b perform time-domain filtering using TDE, for example.

As mentioned above, the digital filtering device 400 has a configuration in which three frequency-domain filtering circuits and two time-domain filtering circuits are alternately connected in series. Thus, the digital filtering device 400 can achieve a filtering process of repeating frequency-domain filtering and time-domain filtering multiple times.

The digital filtering device 400 includes the first data rearranging circuit 113 preceding the first digital filter circuit 111a and the second data rearranging circuit 114 following the third digital filter circuit 111c.

The first data rearranging circuit 113 and the second data rearranging circuit 114 are buffer circuits to rearrange data. The first data rearranging circuit 113 and the second data rearranging circuit 114 rearrange a data sequence based on relationships of dependence among the data on the FFT algorithm before the start of the filtering and after the end of the filtering by the digital filtering device 400, respectively.

Specifically, the first data rearranging circuit 113 rearranges data arranged in "serial in-order", which is the input sequence of the data inputted into the digital filtering device 400, into "bit-reverse-order", which is the input sequence of the data inputted into the first digital filter circuit 111a. On the other hand, the second data rearranging circuit 114 rearranges data arranged in "bit-reverse-order", which is the output sequence of the data output by the third digital filter circuit 111c, into the "serial in-order", which is the output sequence of the data output by the digital filtering device 400. FIGS. 3 and 4 illustrate details of the "serial in-order" and the "bit-reverse-order", respectively.

The fourth digital filter circuit 112a performs time-domain filtering on time-domain signals filtered by the first digital filter circuit 111a and outputs the results to the second digital filter circuit 111b. Similarly, the fifth digital filter circuit 112b performs time-domain filtering on time-domain signals filtered by the second digital filter circuit 111b and outputs the results to the third digital filter circuit 111c. For example, if the digital filtering device 400 performs equalization processing of signal distortion in a communication channel, complex multipliers can compose the fourth digital filter circuit 112a and the fifth digital filter circuit 112b.

Next, a configuration of the FFT circuit 211 will be described that composes the first digital filter circuit 111a, the second digital filter circuit 111b, and the third digital filter circuit 111c.

Figure 2:
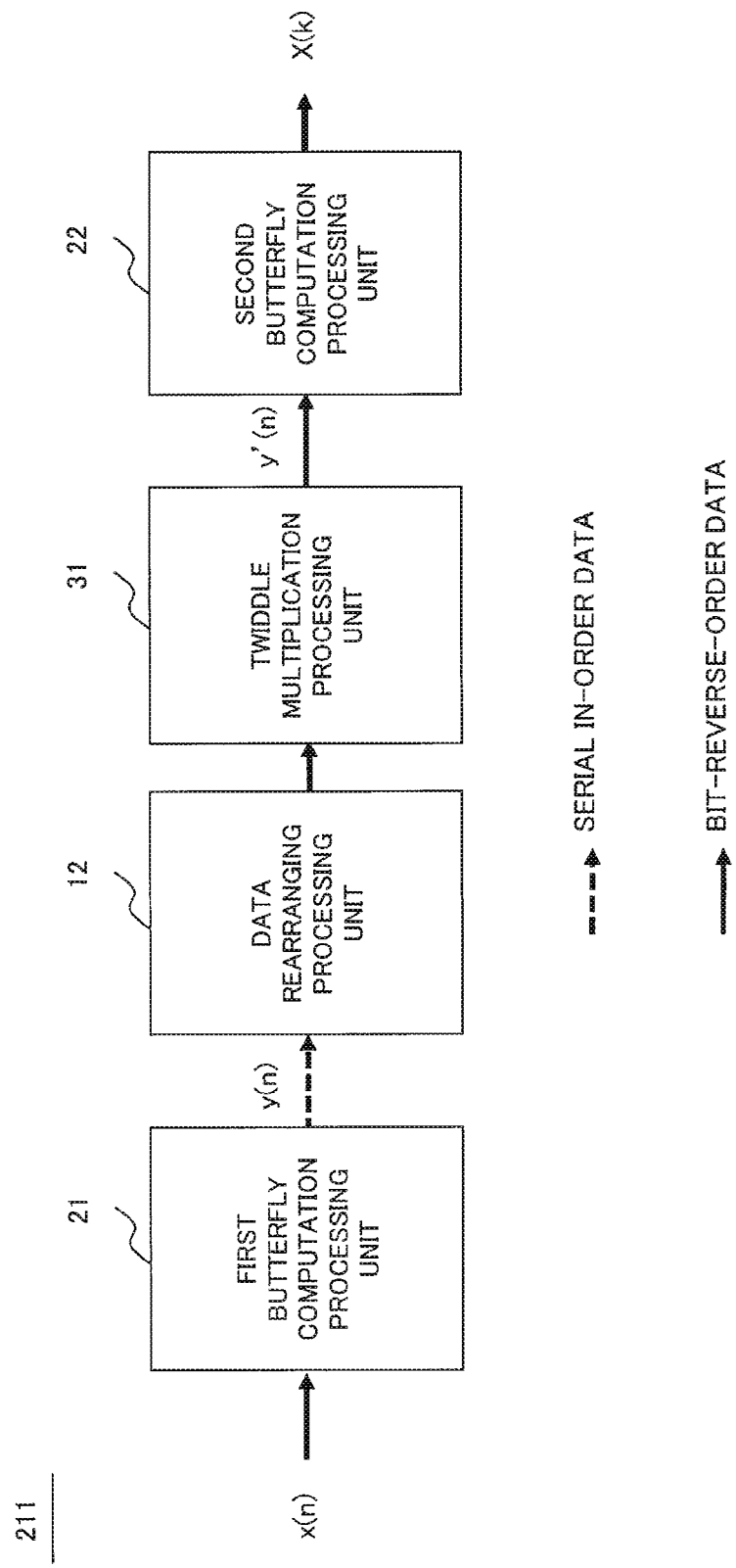
FIG. 2 is a block diagram illustrating a configuration of an FFT circuit 211 in accordance with the first exemplary embodiment of the present invention.

FIG. 2 is a block diagram illustrating an exemplary configuration of the FFT circuit 211 in accordance with the first exemplary embodiment of the present invention. The FFT circuit 211 processes 64-point FFT decomposed into two-stage butterfly processing with radix-8 using a pipelined circuit technique according to the dataflow 500 illustrated in FIG. 6. The FFT circuit 211 receives input of time-domain data $x(n)$ ($n=0, 1, \ldots, 63$), and Fourier-transforms $x(n)$ by FFT processing to generate and output frequency-domain signals $X(k)$ ($k=0, 1, \ldots, 63$).

Figure 6:
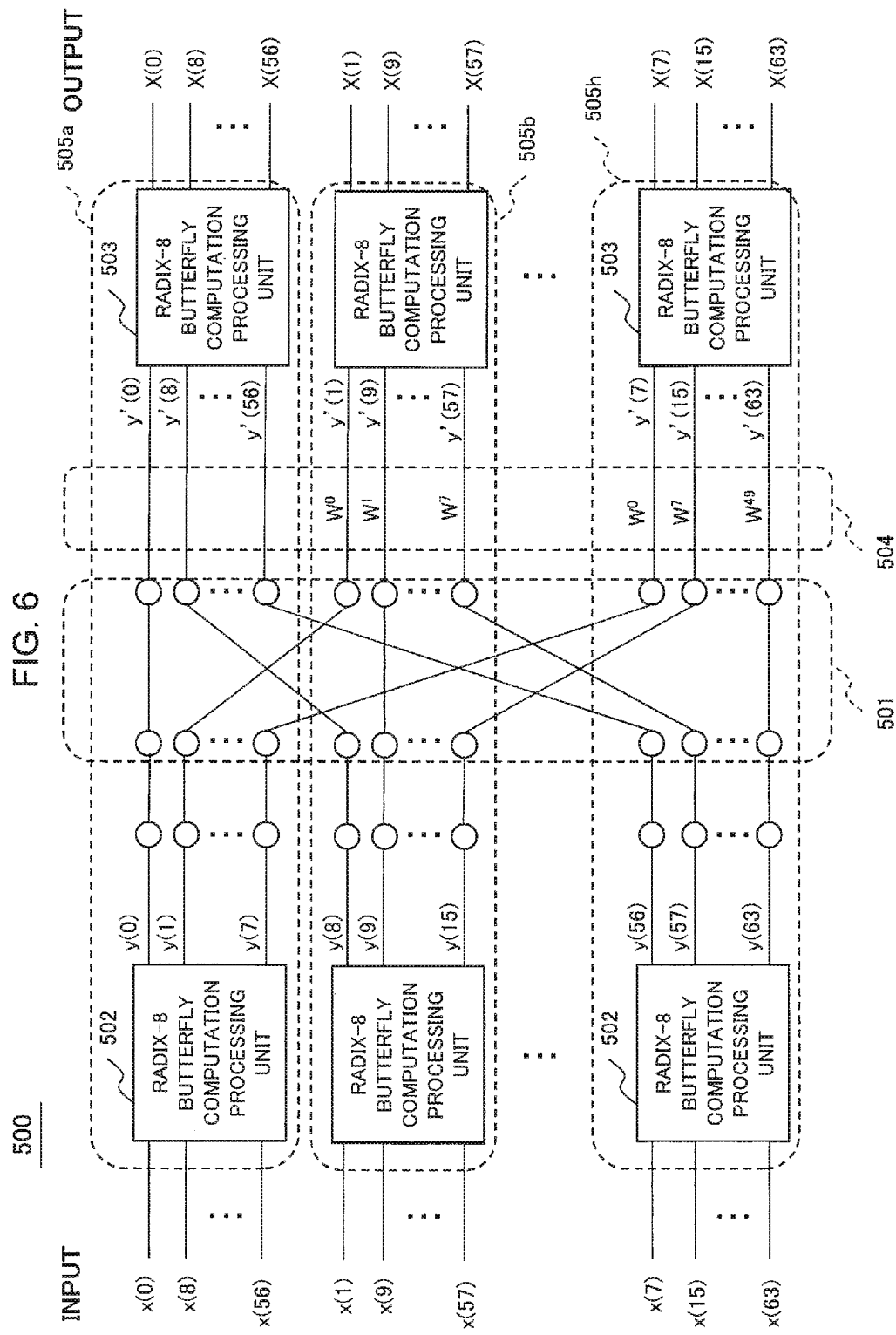
FIG. 6 is a diagram illustrating a dataflow 500 of 64-point FFT processing using two-stage butterfly computation.
Figure 7:
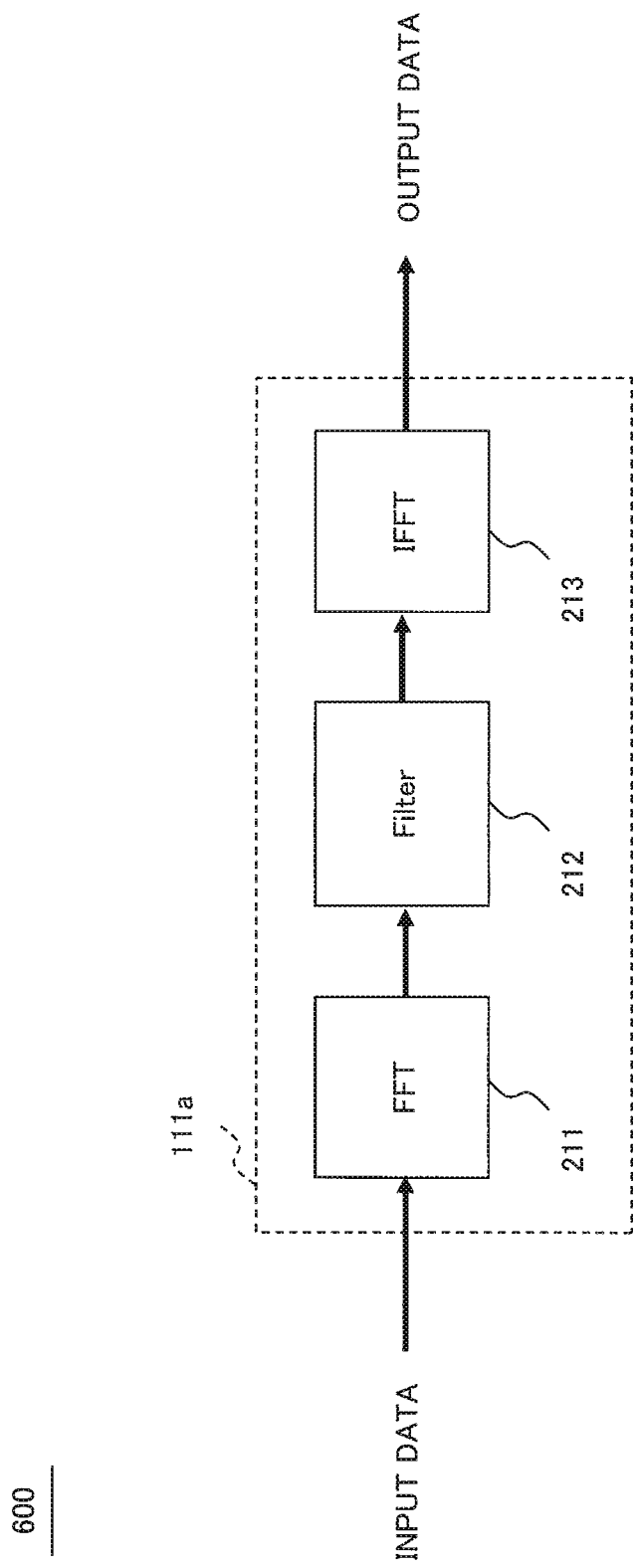
FIG. 7 is a block diagram illustrating a configuration of a digital filtering device 600 in accordance with a second exemplary embodiment of the present invention.

Circuit implementation of the entire 64-point FFT processing illustrated in the dataflow in FIG. 6 requires huge-size circuitry. For this reason, the FFT circuit 211 performs 64-point FFT processing in 8-data parallel. In this case, the FFT circuit 211 receives input of time-domain data $x(n)$, and Fourier transforms the time-domain data $x(n)$ by FFT processing to generate and output frequency-domain signals $X(k)$. In this case, a total of 64 pieces of the data are inputted as input data $x(n)$ by eight pieces of data during the period of eight cycles in the "bit-reverse-order" illustrated in FIG. 4. The numbers from 0 to 63 shown as the contents of the table in FIG. 4 represent indices n of $x(n)$.

Specifically, eight pieces of data $x(0)$, $x(8)$, $x(16)$, ..., $x(56)$ composing a data set P1 are inputted in the first cycle. Then, in the second cycle, eight pieces of data $x(1)$, $x(9)$, $x(17)$, ..., $x(57)$ composing a data set P2 are inputted. After those cycles, likewise, data composing data sets from P3 to P8 are inputted in a cycle from the third cycle to eighth cycle.

Similarly, 64 pieces of the data are output as output data $X(k)$ by eight pieces of data during the period of eight cycles in the "bit-reverse-order" illustrated in FIG. 4. The numbers from 0 to 63 shown as the contents of the table in FIG. 4 represent indices k of $X(k)$.

Specifically, eight pieces of data $X(0)$, $X(8)$, ..., $X(56)$ composing the data set P1 are output in the first cycle. Eight pieces of data $X(1)$, $X(9)$, ..., $X(57)$ composing the data set P2 are output in the second cycle. After those cycles, likewise, data composing the data sets from P3 to P8 are output in a cycle from the third cycle to eighth cycle.

The first data rearranging circuit 113 performs the rearrangement from "serial in-order" (see FIG. 3), which is the input sequence of the data inputted into the digital filtering device 400, into "bit-reverse-order" (see FIG. 4), which is the input sequence of the data inputted into the FFT circuit 211 composing the first digital filter circuit 111a.

The bit-reverse-order illustrated in FIG. 4 corresponds to the data sets inputted into the radix-8 butterfly process 502 at the first stage of the dataflow diagram illustrated in FIG. 6. Specifically, eight pieces of data $x(0)$, $x(8)$, ..., $x(56)$ composing the data set P1 are inputted in the first cycle. Then, in the second cycle, eight pieces of data $x(1)$, $x(9)$, ..., $x(57)$ composing the data set P2 are inputted. After those cycles, likewise, data composing data sets from P3 to P8 are inputted in a cycle from the third cycle to eighth cycle.

"Serial in-order" and "bit-reverse-order" will now be described specifically. The "serial in-order" means the sequence of the eight data sets of P1, P2, P3, P4, P5, P6, P7, and P8 illustrated in FIG. 3. The data set Ps, where s is a value indicating the order of processing cycles and $s=1, \ldots, 8$, is composed of eight pieces of data arranged in order from ps(0) to ps(7), and ps(i) is expressed as follows.

$$ps(i)=8(s-1)+i$$

The data sets are arranged in the order of P1, P2, P3, P4, P5, P6, P7, and P8 corresponding to the progress on the processing cycle. In other words, the serial in-order is the order in which "is" pieces of data are arranged by arranging the data by "i" pieces in the order of the data from the head of the data to make "s" pieces of data sets and arranging the data sets in the order of cycles.

The "bit-reverse-order" means the sequence of the eight data sets of Q1, Q2, Q3, Q4, Q5, Q6, Q7, and Q8 illustrated in FIG. 4. The data sets Qs is composed of eight pieces of data from qs(0) to qs(7), and qs(i) is expressed as follows.

$$qs(i)=(s-1)+8i$$

The data sets are arranged in the order of Q1, Q2, Q3, Q4, Q5, Q6, Q7, and Q8 corresponding to the progress on the processing cycles. In other words, the bit-reverse-order is the order in which "is" pieces of data inputted in serial in-order are arranged by arranging the data by "s" pieces in the order of cycles from the head of the data, and arranging "i" pieces of data in the same cycle as a set in the order of the data.

In this way, each data set in the bit-reverse-order is determined uniquely if each set in the serial in-order is set. The i-th piece of data composing the respective data sets Qs ($s=1, \ldots, 8$) in the bit-reverse-order is equal to the s-th piece of data in the cycle "i" in the serial in-order. That is to say, the following equation is satisfied.

$$Qs(i)=Pi(s)$$

As seen above, Qs(i) and Pi(s) have a relationship in which the sequence for the progress on the cycle is interchanged with the sequence for the data position in the data composing each data set. Accordingly, by rearranging, in the bit-reverse-order, the data inputted in the bit-reverse-order, the inputted data are turned into the data in the serial in-order.

Each row ps(i) in FIG. 3 and the eight rows qs(i) in FIG. 4 represent the data inputted into the i-th piece of data in the next stage, respectively. Each of the eight numbers included in each data set is identification information to identify one of the points of FFT and, specifically, it is a value of the index n of $x(n)$.

The serial in-order and the bit-reverse-order are not limited to those exemplified in FIGS. 3 and 4. That is to say, each data set in serial in-order can be created by arranging data in sequence depending on the number of points of FFT, the number of cycles, and the number of pieces of data to be processed in parallel, as described above. Each data set in bit-reverse-order can be created by interchanging the sequence for the progress on the cycle with the sequence for the data position in the data inputted in serial in-order, as described above.

The FFT circuit 211 includes a first butterfly computation processing unit 21, a data rearranging processing unit 12, a twiddle multiplication processing unit 31, and a second butterfly computation processing unit 22. The FFT circuit 211 performs pipeline processing on a first butterfly computation process, a data rearranging process, a twiddle multiplication process, and a second butterfly computation process.

The first butterfly computation processing unit 21 is a butterfly circuit that performs the first round of butterfly computation process 502 (a first butterfly computation process) of radix-8 butterfly computation processes duplicated in the dataflow 500 in FIG. 6. The first butterfly computation processing unit 21 outputs the results of the butterfly computation process in the serial in-order shown in FIG. 3 as data y(n) (n=0, 1, . . . , 63).

The data rearranging processing unit 12 rearranges the data y(n) output in the serial in-order by the first butterfly computation processing unit 21 into data in the bit-reverse-order shown in FIG. 4 in order to input the data y(n) into the second butterfly computation processing unit 22.

The twiddle multiplication processing unit 31 is a circuit that deals with complex rotation on the complex plane in FFT computation after the first butterfly computation process and corresponds to the twiddle multiplication process 504 in the dataflow 500 in FIG. 6. The rearrangement of data is not performed in the twiddle multiplication process.

The second butterfly computation processing unit 22 is a butterfly circuit that performs the second round of radix-8 butterfly process 503 in the dataflow diagram in FIG. 6. The second butterfly computation processing unit 22 performs the butterfly computation process on data y'(n) (n=0, 1, . . . , 63) inputted in the bit-reverse-order after the twiddle multiplication process and outputs the results X(k) (n=0, 1, . . . , 63) in the bit-reverse-order likewise.

The data rearranging processing unit 12 temporarily stores inputted data and achieves the data rearranging process according to each of the serial in-order shown in FIG. 3 and the bit-reverse-order shown in FIG. 4 by controlling selection and output of the stored data. A specific example of the data rearranging processing unit is provided below.

Figure 5:
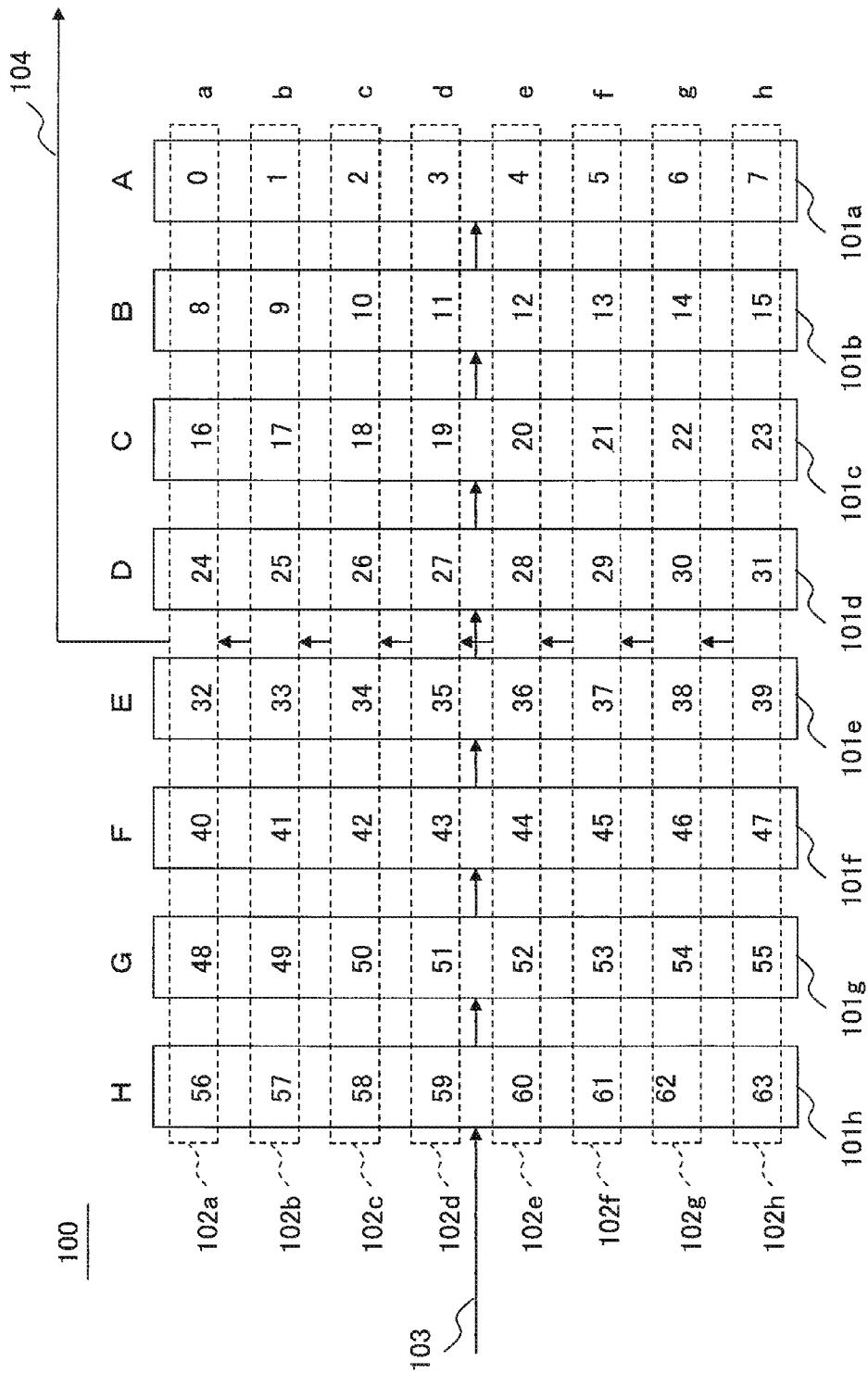
FIG. 5 is a block diagram illustrating an exemplary configuration of a data rearranging circuit 100 in accordance with the first exemplary embodiment of the present invention.

The data rearranging processing unit 12 can be implemented by a data rearranging processing unit 100 illustrated in FIG. 5, for example.

The data rearranging processing unit 100 receives input of data sets D1 to D8 each of which is composed of eight pieces of data inputted as input information 103 in the first-in order in an FIFO (First-In First-Out) buffer, writes the data sets into data storage locations 101a to 101h, and stores them. Specifically, the data sets D1 to D8 are stored in data storage locations 101a to 101h, respectively.

Next, the data rearranging processing unit 100 outputs the stored data in the first-out order in a FIFO buffer. Specifically, the data rearranging processing unit 100 reads out eight pieces of data from each of data read locations 102a to 102h, combines them into one data set, and outputs eight data sets D1' to D8' as output information 104. Thus, each of the data sets D1' to D8' is configured as one set by rearranging the data arranged in the order of cycles included in the data sets D1 to D8 into data in the order of data positions.

As described above, the data rearranging processing unit 12 in the FFT circuit 211 needs to perform the rearranging process according to each of the serial in-order shown in FIG. 3 and the bit-reverse-order shown in FIG. 4. The reason is that it is necessary to use eight cycles for the FFT processing and rearrange data across the cycles because the FFT circuit 211 performs 64-point FFT processing in 8-data parallel.

The IFFT circuit 213, which composes the first digital filter circuit 111a, the second digital filter circuit, and the third digital filter circuit 111c, can be implemented with a configuration similar to that of the FFT circuit 211.

The filter computation circuit 212, which composes the first digital filter circuit 111a, the second digital filter circuit 111b, and the third digital filter circuit 111c, performs filtering on frequency-domain signals transformed by the FFT circuit 211 and outputs processing results to the IFFT circuit 213. For example, if the digital filtering device 400 performs equalization processing of signal distortion in a communication channel, the filter computation circuit 212 can be configured by a complex multiplier.

Operation in First Exemplary Embodiment

The FFT circuit 211, which composes the first digital filter circuit 111a, the second digital filter circuit 111b, and the third digital filter circuit 111c, receives input of data in the bit-reverse-order shown in FIG. 4, performs FFT processing on the data, and outputs data also in the bit-reverse-order.

Similarly, the IFFT circuit 213, which composes the first digital filter circuit 111a, the second digital filter circuit 111b, and the third digital filter circuit 111c, also receives input of data in the bit-reverse-order, performs IFFT processing on the data, and outputs data also in the bit-reverse-order.

Accordingly, the filter computation circuit 212, which composes the first digital filter circuit 111a, the second digital filter circuit 111b, and the third digital filter circuit 111c, performs filter computation processing in the bit-reverse-order and outputs data in the bit-reverse-order. Similarly, the fourth digital filter circuit 112a and the fifth digital filter circuit 112b also perform filter computation processing in the bit-reverse-order and outputs data in the bit-reverse-order.

The first data rearranging circuit 113 performs rearranging process from the serial in-order, which is the order in which data is inputted into the digital filtering device 400, into the bit-reverse-order, which is the order in which the first digital filter circuit 111a receives input of data. On the other hand, the second data rearranging circuit 114 performs rearranging process from the bit-reverse-order, which is the order in which the third digital filter circuit 111c outputs data, into the serial in-order, which is the order in which the digital filtering device 400 outputs data.

Advantageous Effects by First Exemplary Embodiment)

As described above, according to the present exemplary embodiment, the first digital filter circuit 111a rearranges data inputted into the digital filtering device 400 in the serial in-order into data in the bit-reverse-order. And then the filter computation circuit 212, which composes the first digital filter circuit 111a, the second digital filter circuit 111b, and the third digital filter circuit 111c, performs frequency-domain filtering on the data in the bit-reverse-order without transformation. Similarly, the fourth digital filter circuit 112a and the fifth digital filter circuit 112b perform time-domain filtering in the bit-reverse-order.

Accordingly, in the present exemplary embodiment, the FFT circuit 211 and the IFFT circuit 213 do not have to perform the rearranging process from the serial in-order into the bit-reverse-order at the input of the FFT circuit 211, the rearranging process from the bit-reverse-order into the serial in-order at the output of the FFT circuit 211. The FFT circuit 211 and the IFFT circuit 213 compose the first digital filter circuit 111a, the second digital filter circuit 111b, and the third digital filter circuit 111c. Similarly, the FFT circuit 211 and the IFFT circuit 213 do not have to perform the rearranging process from the serial in-order into the bit-reverse-order at the input of the IFFT circuit 213, and the rearranging process from the bit-reverse-order into the serial in-order at the output of the IFFT circuit 213. Therefore, data rearranging circuits are made unnecessary at the input and output of the FFT circuit 211 and at the input and output of the IFFT circuit 213. Consequently, it is made possible to reduce the size and power consumption of the circuitry.

Although the digital filtering device in accordance with the present exemplary embodiment includes three frequency-domain filtering circuits using FDE and two time-domain filtering circuits using TDE, the number of the filtering circuits may not be limited to them.

Second Exemplary Embodiment

In the first exemplary embodiment, frequency-domain filtering is performed three times and time-domain filtering is performed twice, where the frequency-domain filtering and the time-domain filtering are alternately performed. However, the number and the sequence of each filtering are optional in the present invention. That is to say, time-domain filtering processes or frequency-domain filtering processes may be successively performed. In addition, only one of the time-domain filtering and the frequency-domain filtering may be performed a plurality of times.

In brief, the present invention is characterized in that data are not rearranged just before the following FFT/IFFT processing, and the following FFT/IFFT processing receives input of data and processes the data in the order in which the data are output as the results of the preceding FFT/IFFT processing.

The digital filtering device 400 does not have to include the data rearranging circuits. That is to say, the processing equivalent to that in the first data rearranging circuit 113 may be performed at the stage preceding the digital filtering device 400, or the processing equivalent to that in the second data rearranging circuit 114 may be performed at the stage following the digital filtering device 400.

A digital filtering device 600 in accordance with a second exemplary embodiment includes only the first digital filter circuit 111a in the first exemplary embodiment. That is to say, it is optional whether to perform filtering processes or not even after the first digital filter circuit 111a. The FFT circuit 211 and the IFFT circuit 213 can use the internal configuration illustrated in FIG. 2, for example.

Butterfly computation is performed on data inputted into the first digital filter circuit 111a, and the rearranging processing, as illustrated in FIG. 2, for example, is not performed on the data. Therefore, data rearranging process to input data into the butterfly computation process can be performed using an external circuit corresponding to the first data rearranging circuit 113. However, if the above-mentioned butterfly computation modifies the sequence of data, a rearranging process to modify the sequence to another sequence may be performed.

The data to be inputted into the first digital filter circuit 111a may be inputted in a sequence suitable for the butterfly computation that is executed immediately after the input. Therefore, it makes no difference if the sequence is the bit-reverse-order or the serial in-order.

As described above, the digital filtering device 600 in accordance with the present exemplary embodiment performs computation processing without rearranging data inputted in prescribed sequence. Accordingly, the digital filtering device 600 in accordance with the present exemplary embodiment makes it possible to minimize the number of data rearranging processes and therefore to reduce the size and power consumption of the circuitry.

It is assumed in the first and the second exemplary embodiments that all of FFT and IFFT processes are performed by components such as discrete circuits. However, the process in each exemplary embodiment may be performed by software using a computer included in a prescribed device, for example, a DSP (digital signal processor) or the like. That is to say, a computer storage medium for performing each process may be read and executed by a DSP (not shown).

The data rearranging process in the first data rearranging circuit 113 and the second data rearranging circuit 114 may be performed using a storage medium. That is to say, the data rearranging process may be performed using a DSP and a memory by controlling operations to write data into the memory and read data from the memory by a storage medium. The above-described storage medium may be stored in a non-transitory medium including a semiconductor storage device such as a ROM (read only memory), a RAM (random access memory), and a flash memory, an optical disc, a magnetic disk, a magneto-optical disk, and the like.

The present invention has been described by taking the exemplary embodiments described above as model examples. However, the present invention is not limited to the aforementioned exemplary embodiments. The present invention can be implemented in various modes that are apparent to those skilled in the art within the scope of the present invention.

This application is based upon and claims the benefit of priority from Japanese Patent Application No. 2013-196638, filed on Sep. 24, 2013, the disclosure of which is incorporated herein in its entirety by reference.

REFERENCE SIGNS LIST

12 Data rearranging processing unit
21 First butterfly computation processing unit
22 Second butterfly computation processing unit
31 Twiddle multiplication processing unit
100 Data rearranging processing unit
103 Input information
101a to 101h Data storage location
102a to 102h Data read location
104 Output information
111a First digital filter circuit
111b Second digital filter circuit
111c Third digital filter circuit
112a Fourth digital filter circuit
112b Fifth digital filter circuit
113 First data rearranging circuit 114 Second data rearranging circuit
211 FFT circuit
212 Filter computation circuit
213 IFFT circuit
400 Digital filtering device
500 Dataflow
501 Data rearranging process
502, 503 Butterfly computation process
504 Twiddle multiplication process
505 Sub-dataflow
600 Digital filtering device

What is claimed is:

1. A digital filtering device, comprising:
a first filtering circuit configured to receive first data in a first sequence without rearrangement, perform, in a frequency-domain a first filtering process including a fast Fourier transformation process and an inverse fast Fourier transformation process on the first data, and output second data in the first sequence; and
a second filtering circuit configured to receive the second data in the first sequence without rearrangement from the first filtering circuit, perform, in a time-domain, a second filtering process on the second data, and output third data in the first sequence.

2. The digital filtering device according to claim 1, wherein the first filtering circuit includes
first butterfly computation processing circuit configured to perform first butterfly computation on the first data received in the first sequence and output fourth data in a second sequence different from the first sequence;
first data rearranging processing circuit configured to rearrange into the first sequence the fourth data received in the second sequence;
twiddle multiplication processing circuit configured to perform twiddle multiplication on the fourth data received in the first sequence and output fifth data in the first sequence; and
second butterfly computation processing circuit configured to perform second butterfly computation on the fifth data received in the first sequence and output the second data in the first sequence.

3. The digital filtering device according to claim 2, further comprising
second data rearranging processing circuit configured to rearrange into the first sequence the first data received in the second sequence.

4. The digital filtering device according to claim 3, further comprising
third data rearranging processing circuit configured to rearrange into the second sequence the third data received in the first sequence.

5. The digital filtering device according to claim 2, further comprising
third data rearranging processing circuit configured to rearrange into the second sequence the third data received in the first sequence.

6. A digital filtering method, comprising:
receiving first data in a first sequence without rearrangement;
performing, in a frequency-domain, a first filtering process on the first data, the first filtering process including a fast Fourier transformation process and an inverse fast Fourier transformation process;
outputting second data in the first sequence;
receiving the second data the First sequence without rearrangement;
performing, in a time-domain, a second filtering process on the second data; and
outputting third data in the first sequence.

7. A non-transitory storage medium storing a program for making a computer included in a digital filtering device function as filtering means for
receiving first data in a first sequence without rearrangement;
performing, in a frequency-domain, on the first data a first filtering process including a fast Fourier transformation process and an inverse fast Fourier transformation process,
outputting second data in the first sequence,
receiving the second data in the first sequence without rearrangement,
performing, in a time-domain, a second filtering process on the second data, and
outputting third data in the first sequence.

* * * * *